United States Patent [19]

Migrin

[11] 4,335,283
[45] Jun. 15, 1982

[54] TEMPERATURE COMPENSATED FILL VALVE/PRESSURE SWITCH

[75] Inventor: Robert S. Migrin, Dearborn, Mich.

[73] Assignee: Eaton Corporation, Cleveland, Ohio

[21] Appl. No.: 100,687

[22] Filed: Dec. 5, 1979

[51] Int. Cl.³ .................................................. H01H 35/24
[52] U.S. Cl. .................................... 200/61.25; 29/622; 73/146.8; 337/320
[58] Field of Search ........................ 340/58; 337/320; 29/622; 73/146.8; 200/61.22, 61.25, 83 P

[56] References Cited

U.S. PATENT DOCUMENTS

| | | | |
|---|---|---|---|
| 3,487,348 | 12/1969 | Linsalato | 337/320 |
| 3,743,801 | 7/1973 | Brobeck et al. | 200/61.25 |
| 3,889,077 | 6/1975 | Hayashi | 200/61.25 |
| 3,908,105 | 9/1975 | Schuler | 200/61.25 |
| 4,117,281 | 9/1978 | Leimbach | 200/61.25 |
| 4,177,671 | 12/1979 | Ichihara et al. | 73/146.5 |
| 4,181,831 | 1/1980 | Mayer et al. | 200/61.25 |

Primary Examiner—Gene Z. Rubinson
Assistant Examiner—Morris Ginsburg
Attorney, Agent, or Firm—C. H. Grace; J. G. Lewis

[57] ABSTRACT

A device (10) for filling a pneumatic tire and sensing the air pressure therein has a check valve (20) disposed within a valve stem (126b) and a pressure sensing switch which is temperature compensated to adjust for air pressure changes within the tire due to changes in ambient temperature. Substantially perfect compensation can be achieved, within a limited range of operation, whereby the set point pressure versus temperature characteristic will track with the related tire pressure versus temperature characteristic. A sealed capsule (110) is assembled and pressurized prior to installation within the device. A manual set point calibration feature is provided. The switch can be employed independently of, as well as in conjunction with, the check valve.

37 Claims, 5 Drawing Figures

TEMPERATURE COMPENSATED FILL VALVE/PRESSURE SWITCH

INTRODUCTION

This invention relates to apparatus for pressurizing containers and monitoring fluid pressure level therein and specifically to apparatus and methods of manufacturing temperature compensated pressure switches for pneumatic tires.

CROSS-REFERENCE

The present invention represents an improvement of the invention described in application U.S. Ser. No. 974,284, filed Dec. 29, 1978, now U.S. Pat. No. 4,254,312.

BACKGROUND OF THE INVENTION

A number of pneumatic tire fill valves which include pressure sensing switches have been suggested by the prior art. Typically, such valves have been employed in tire pressure monitors in which a valve is associated with each tire to monitor the air pressure therein and to close or open an electrical switch, thereby actuating a radio transmitter, when the fluid pressure within one of the tires falls below a predetermined level. Frequently, mechanical pop-out or other attention attracting devices have been incorporated within the valve to eliminate the need for interfacing the low tire condition information between the tire and vehicle body.

Prior art schemes frequently have undesirable characteristics in certain applications. The most significant shortcoming of prior art devices is their inability to compensate for temperature variations in the surrounding atmosphere. This is particularly important in applications with pneumatic tires inasmuch as the temperature of the fluid or air within the tire varies over an extremely large range due to heat generated during operation as well as ambient temperature changes. In such cases the pressure within the tire also varies greatly. Prior art units merely compare the pressure within the tire with ambient or atmospheric pressure. If the unit has a single pressure set point at which the valve actuates its warning mechanism, the calibration pressure will remain constant. The tire pressure, on the other hand will vary as a function of ambient temperature. This variation can be so extreme that a tire, filled to its recommended level during a relatively hot day or after prolonged operation, can give a false low pressure condition signal due entirely to cooling of the atmosphere.

An additional shortcoming of commercially available valves is their inability to be precisely calibrated. This inability results in tire pressure monitors which may have substantially different set points from wheel to wheel. This shortcoming is even more pronounced in tire pressure monitors which attempt to detect tire pressure changes of relatively few psi.

Valves having electrical switches incorporated therein typically provide for interconnection with the rest of the tire pressure monitoring circuit by dressing leads radially outwardly from the valve stem. Because of the harsh environment found in a typical automotive wheel, these leads can be deteriorated over time and result in either a false low tire condition signal being generated or an open circuit in which no signal will be generated even if such a condition occurs. The commercial units which have been provided to overcome this shortcoming have proven to be extremely expensive and impractical for passenger vehicle applications.

Still another shortcoming of commercially available units is their complexity and manufacturing difficulty such as requiring assembly under pressurized (above or below one atmosphere) conditions. The use of of many components, including gaskets and seal within typically available units, gives rise to leakage problems and calibration inaccuracies with prolonged use. Finally, complexity of design also gives rise to difficulty in manufacturing and thus even a higher cost.

It will be apparent from a reading of the specification that the present invention may be advantageously utilized with pressurized containers and vessels intended for many different applications. However, the invention is especially useful when applied to penumatic tires for motor vehicles and will be described in connection therewith.

BRIEF DESCRIPTION OF THE INVENTION

The present invention relates to a device for monitoring fluid pressure within a pressurized container such as a pneumatic tire. The inventive device is a temperature compensated switch which is actuated as a function of fluid pressure through the displacement of a moving contact with respect to a fixed contact within a housing to change the switch contact state at a selected pressure level, and which varies the selected pressure level as a function of fluid temperature by displacing the moving contact through operative engagement with a compliant wall member of a sealed pressurized capsule fixedly retained by the housing. This arrangement has the advantage of providing an improved switch device which is temperature compensated to negate the effects of ambient temperature changes upon the switch pressure calibration.

In the preferred embodiment of the invention, the switch is integrated within the body of a device including a fluid controlling valve which selectively passes fluid through an inlet passage to the container, resulting is a single convenient (to install), compact unit.

The present invention also relates to a method of manufacturing the above described embodiments including, but not restricted in order, to the steps of installing the switch within the pre-formed body, forming a capsule discretely from the body, the capsule being constructed of a first substantially rigid wall member and a second compliant wall member coacting to define a sealable cavity, pressurizing fluid within the cavity to a predetermined value, sealing the cavity, and installing the capsule within the body so that the first wall member is fixed with respect thereto and the second wall member operatively engages the moving contact within the switch. This method has the advantage of providing a pressure switch which is temperature compensated, structurally sound (and well suited for a pneumatic tire environment) and has an extremely long operating life. Additionally, this method has the advantage of providing a simplified assembly process in which only the step of sealing the capsule must be performed under pressurized conditions. The other steps can be performed under normal atmospheric conditions.

According to an aspect of the invention, the capsule retention means also comprises means for manual calibration of the selected level. This provides the advantage of permitting manual calibration of the device during and after assembly to assure that all of the devices employed on a common vehicle have the same selected level and temperature compensation characteristics.

According to still another aspect of the invention, the capsule comprises a rigid metal body portion and a metal diaphragm welded to one another at their adjoining circumferential surfaces. The rigid body portion defines threads which matingly engage corresponding threads defined by the device body which are substantially coaxially aligned with the inlet passage of the device. This arrangement has the advantage of providing an extremely compact device, the body of which effectively protects the capsule from damage from external agencies to promote long term retention of the capsule seal integrity and thus temperature compensating characteristics of the device itself.

These and other features and advantanges of this invention will become apparent upon reading the following specification, which, along with the patent drawings, describes and discloses a preferred and two alternative embodiments of the invention in detail.

The detailed description of the specific embodiments makes reference to the accompanying drawings.

DETAILED DESCRIPTION OF THE SPECIFIC EMBODIMENTS

The present invention represents an improvement over the invention described in U.S. Pat. No. 4,254,312 and entitled "Temperature Compensated Fill Valve/Pressure Switch". The details of the disclosure of U.S. Pat. No. 4,254,312 are hereby incorporated herein by reference. Specifically, the specification of U.S. Pat. No. 4,254,312 presents a mathematical model in describing operation of the temperature compensation feature of the invention. That mathematical model and theory of operation is equally applicable to the present invention and repetition of the details thereof is deleted here for the sake of brevity.

Figure 1:
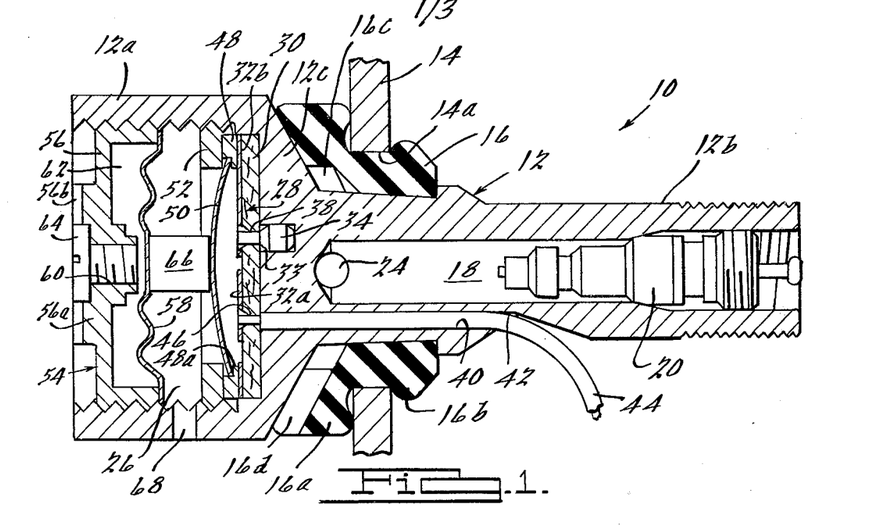
FIG. 1 is a cross-sectional view of the preferred embodiment of the invention.
Figure 2:
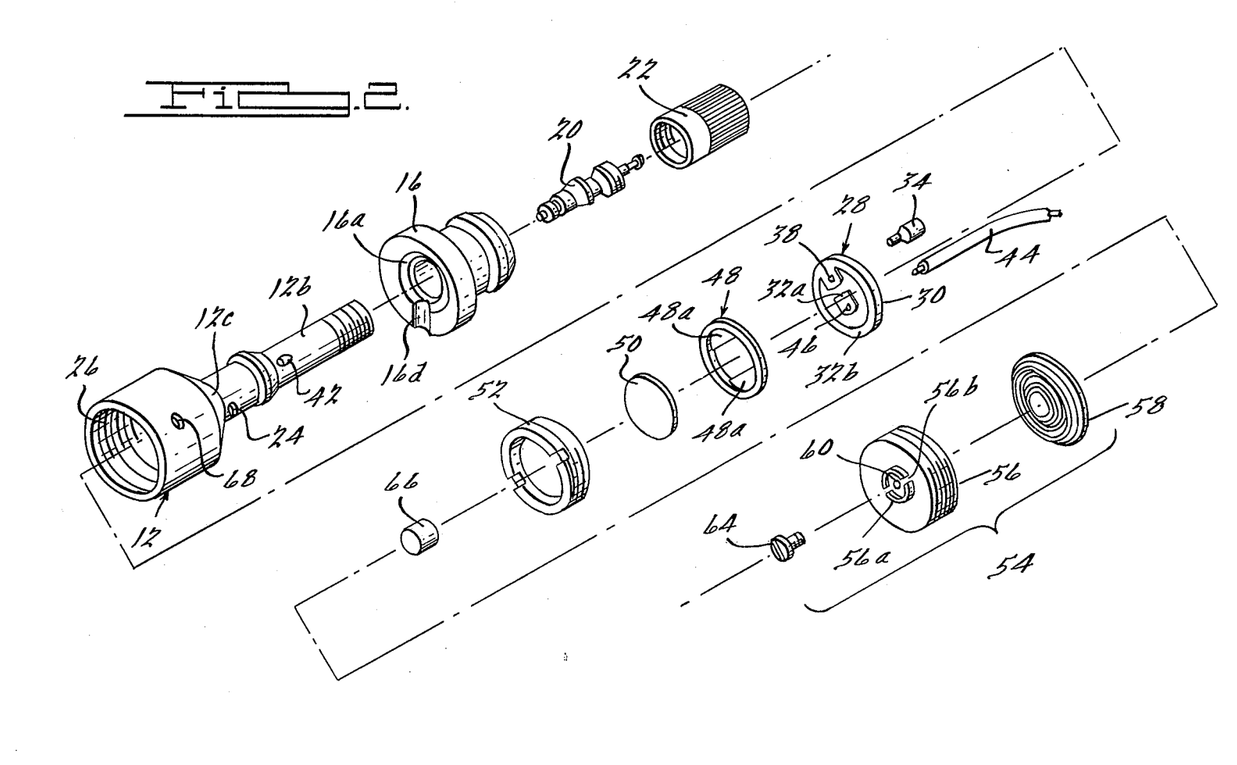
FIG. 2 is an exploded prespective view of the embodiment of FIG. 1.

Referring to FIGS. 1 and 2, a preferred embodiment of a temperature compensated fill valve/pressure switch (valve-switch) 10 is illustrated. Valve-switch 10 has a body 12 comprising a switch housing portion 12a and a valve stem portion 12b. Valve-switch 10 is insulatively mounted to a wheel 14 through an intermediate rubber mounting grommet 16. Wheel 14 supports a pneumatic tire (not illustrated) in the conventional manner, switch housing portion 12a being disposed within a cavity defined by the tire and wheel 14 with valve stem portion 12b projecting outwardly through an aperture 14a in wheel 14. The right-hand most end (in FIG. 1) of valve stem portion 12b is thus accessible for inspection and inflation of the tire when valve-switch 10 is used in application with a motor vehicle or the like. Although the present invention is being described in application with a motor vehicle having a conventional pneumatic tire, it is contemplated that valve-switch 10 and the alternative embodiments described herein could be applied to other pressurized containers or vessels.

Grommet 16 defines two areas of increased diameter 16a and 16b which are spaced from one another and straddle and sealingly embrace wheel 14, preventing axial displacement of valve-switch 10 with respect thereto. Valve-switch 10 is employed to pressurize the tire by providing a path of fluid communication between the atmosphere and the cavity defined by the tire and wheel 14. Valve stem portion 12b has an axial bore 18 therethrough. A valve core assembly 20 is threadably disposed within bore 18 in the usual manner and operates to admit pressurized air into the tire but check its escape therefrom. Inasmuch as its operation is well known in the art, the structural details of valve core assembly 20 are deleted here for the sake of brevity. The end of bore 18 communicating with the atmosphere is, in application, closed by a dust cap 22 (see FIG. 2) which threadably engages the outer surface of valve stem portion 12b.

The other end of bore 18 communicates with the tire cavity through a radially disposed bore 24 in body 12. Bore 24 opens radially disposed outwardly into an annular cavity 16c formed in grommet 16. Cavity 16c communicates with the tire cavity through a relief passage 16d also formed in grommet 16. Valve-switch 10 therefore defines an inlet passage for pressurizing the tire comprising bores 18 and 24 and passages 16c and 16d. Valve core assembly 20 acts as a check valve, whereby air can be forced inwardly therethrough to pressurize the tire but escape of air therefrom is prevented. Rubber grommet 16 serves to electrically isolate valve-switch 10 from wheel 14 as well as to form an air tight seal between the two. Valve stem portion 12b is constructed of brass or other suitable conductive material and serves as an electrical terminal as well as a structural support member for valve core assembly 20.

The switch housing portion 12a of body 12 defines a switch receiving cavity 26 which is open at its left-hand most end (in FIG. 1) and closed at its right-hand most end by transition area 12c of body 12 located intermediate switch housing portion 12a and valve portion 12b. A disc shaped circuit board 28 nests within switch receiving cavity 26 adjacent transition area 12c. Circuit board 28 is constructed in usual manner, comprising a base portion 30 of insulating pressed fiber board or the like and first and second conducting surface portions 32a and 32b respectively. Surface portions 32a and 32b are formed from conducting metal foil or the like which is affixed to base portion 30. Base portion 30 therefore serves as an insulator as well as a structural substrate for circuit board 28. Surface portion 32b rings the circumferential surface of base portion 30, encircling the smaller first portion 32a. First and second portions 32a and 32b define soldering pads which have axially aligned apertures 38 and 46 passing therethrough. Apertures 38 and 46 are countersunk on the conducting surface portion side of circuit board 28 and pass through base portion 30.

Circuit board 28 is nestingly positioned in switch receiving cavity 26 with base portion 30 abutting transition area 12c of body 12. A blind bore 33 within transition area 12c opens into switch receiving cavity 26 and registers with aperture 38 in circuit board 28. A locating pin 34 constructed of other suitable conductive material is press fitted within aperture 33 and forms a leftwardly projecting mounting pin which passes through aperture 38 and is electrically connected to second portion 32b such as by soldering. The countersunk portion of circuit board 28 is to accommodate the solder without creating a projection above the surface thereof. Pin 34 therefore locks circuit board 28 into the illustrated position preventing rotational or axial displacement thereof and also electrically interconnects second portion 32b with body 12. Aperture 46 in circuit board 28 registers with an axially aligned passageway 40 which interconnects switch receiving cavity 26 and the atmosphere. Passageway 40 exits body 12 through an opening 42 in the outer surface of valve stem portion 12b intermediate grommet 16 and the dust cap receiving threads. An insulated electrically conducting wire 44 passes through passageway 40. One end of wire 44 terminates within switch receiving cavity 26, the insulation of which abuts base portion 30 and the conductive portion of which passes through aperture 46 and is electrically connected to first portion 32a such as by soldering. Again, the countersunk portion of a circuit board 28 is to receive the solder without creating a protuberance upon the surface of circuit board 28. The other end of wire 44 exits opening 42 and, in application, is dressed toward a wheel mounted transmitter or the like, such as is disclosed in U.S. Pat. No. 4,254,312. The insulation of wire 44 also serves to form an air tight seal in passageway 40. Conducting second portion 32a is thus electrically connected to wire 44 but insulated from body 12.

An annular washer 48 is nestingly disposed within switch receiving cavity 26, substantially overlaying second conductive portion 32b. Washer 48 has two radially inwardly projecting cresent shaped webs 48a, providing a land for a snap disc 50 which is secured thereby from radial displacement. Disc 50 and washer 48 are formed of electrically conductive material. The inner surface of switch housing portion 12a defining switch cavity 26 is threaded and receives an externally threaded spanner nut 52 which clampingly engages disc 50, washer 48 and circuit board 28, securing them in the position indicated in FIG. 1.

Disc 50 operates as a moving or snap action contact which, upon the application of a prerequisite force upon the convex surface thereof is displaced rightwardly, assuming an abutting relationship against the left hand most surfaces of first and second portions 32a and 32b. Disc 50 is dome shaped to provide a snap action or over center motion for positive actuation as is well known in the art. First portion 32a constitutes a fixed contact which, with disc 50 in the position illustrated in FIG. 1, is electrically insulated from the rest of valve switch 10. When disc 50 is displaced rightwardly from the illustrated position, it effectively electrically interconnects surfaces 32a and 32b thereby forming an electrical circuit comprising wire 44, first surface 32a, disc 50, second surface 32b, pin 34 and body 12. In the embodiment illustrated in FIG. 1, body 12 of valve-switch 10 is used as an electrical terminal, but it is contemplated that body 12 could be grounded to wheel 14 or otherwise electrically reconfigured as would be obvious to one skilled in the art. The gage and material employed in disc 50 will vary depending upon application and desired actuating force level. Such discs are readily available commercially.

A pressurized capsule 54, comprising a first, rigid cup shaped wall member 56 and a second, compliant wall member or diaphragm 58 is enclosed within switch receiving cavity 26 and closes the left hand most end thereof. The external surface of first wall member 56 is threaded and engages the threads formed in switch housing 12a in body 12. The body or first wall member 56 of capsule 54 is sealingly affixed to diaphragm 58 such as by welding around the circumferentially mating edges thereof. An axially aligned aperture 60 defines a passageway between the tire cavity and switch cavity 62 defined by capsule 54. In application, aperture 60 is closed by an appropriate screw 64 threadably disposed therein after cavity 62 has been pressurized to a predetermined level. A piston or plunger 66 constructed of metal or other suitable material is spot welded to the axis of diaphragm 58 and is thus disposed concentrically with diaphragm 58 and disc 50. The right-hand surface of piston 66 abutts disc 50 and acts to transmit actuating forces from diaphragm 58 to disc 50. A radially aligned aperture 68 in switch housing 12a of body 12 provides fluid communication between the tire cavity and switch receiving cavity 26. Finally, first wall member 56 has an annular leftwardly projecting area of increased wall thickness 56a which defines two opposed radially aligned tool receiving slots 56b. During assembly, a suitable tool such as a spanner wrench engages slots 56b to threadably engage capsule 54 with switch housing 12a of body 12.

So as not to belabor the present specification, a complete description of the theory of operation of the temperature compensation feature of the present invention is deleted herein, it being assumed that the reader has assimilated the description contained in U.S. Pat. No. 4,254,312. Accordingly, for the sake of brevity, only a brief explanation of the method of assembly and theory of operation will be contained herein. The preferred embodiment of valve-switch 10 illustrated in FIG. 1 operates to sense the fluid pressure within a container such as a pneumatic tire and to change the electrical state of a switch at a preselectable level which is effectively re-established with varying temperature to accommodate changed pressure in the tire due solely to change in ambient or operating temperature. In application with a tire which is pressurized to a level above the calibrated switch point of valve-switch 10, fluid pressure within the tire is sensed within switch receiving cavity 26 through aperture 68 on the right-hand most surface of diaphragm 58. This pressure tends to displace diaphragm 58 as well as piston 66 to the left as illustrated in FIG. 1. Capsule 54 has, during assembly, been prepressurized to a level substantially equal to the desired minimum pressure to be contained by the pneumatic tire. Accordingly, the pressure within switch cavity 62 operates to displace diaphragm 58 and piston 66 rightwardly. When the pressure within cavity 62 exceeds that within the pneumatic tire, a pressure differential is established and the center portion of diaphragm 58 and piston 66 is displaced rightwardly. A rightward displacement of piston 66 causes disc 50 to buckle and be displaced rightwardly into an abutting relationship with the left-hand most surface of first and second portions 32a and 32b thereby electrically interconnecting the two. When the tire pressure is equal to or exceeds the desired limit or level, the resultant force applied on the right-hand surface of diaphragm 58 equals or overcomes that applied by the pressurized fluid within cavity 62 tending to displace the center portion of diaphragm 58 and piston 66 leftwardly. This displacement effectively reduces the volume of cavity 62 thereby increasing the pressure therein and the force applied against the left-hand most surface of diaphragm 58. Diaphragm 58 and piston 66 will continue being displaced leftwardly until the forces acting upon both surfaces of diaphragm 58 are equalized. By changing the pressure of switch cavity 62 with changing operating temperature, the capsule temperature compensates valve-switch 10 by effectively recalibrating the switch point thereof with changing fluid temperature.

As should be apparent from a reading of the present specification, the pressure of switch cavity 62 in relation to the requisite traversal distance of disc 50 between the electrically open and electrically short condition must be carefully maintained. Additionally, it is critical that a sealed cavity be provided which retains its seal integrity over adverse operating conditions and long periods of time inasmuch as loss of fluid from switching cavity 62 would miscalibrate valve-switch 10. Due to the stringent requirements, capsule 54 is constructed entirely of steel with diaphragm 58 and wall member 56 being welded together under controlled conditions to insure integrity of the seal therebetween. This assembly procedure is conducted discretely from the rest of the switch to assure seal integrity by eliminating seals, gaskets and prepressurization assembly steps that otherwise would be required. Once the first wall member 56 and diaphragm 58 are sealed together under normal atmospheric conditions, switch cavity 62 is then pressurized by placing capsule 54 within a pressurized environment and cavity 62 is sealed by the insertion of screw 64. An alternative method would entail welding or otherwise sealing member 56 and diaphragm 58 under pressure. A major advantage of the present invention should now be appreciated by one skilled in the art inasmuch as only the step of sealing aperture 60 must take place under other than normal atmospheric conditions during the manufacture and assembly of the present invention. Additionally, inasmuch as capsule 54 is constructed entirely of steel or other suitable material, the seal integrity of the final pressurized capsule 54 is maximumized. If piston 66 is to be welded to diaphragm 58, that process must be carried out prior to pressurization of capsule 54. The fully assembled, pressurized and sealed capsule 54 is then assembled with the remainder of a valve-switch 10 by threadably engaging switch housing portion 12a and advancing capsule 54 therealong until piston 66 abutts disc 50. At this point, valve-switch 10 must be calibrated by being placed in an environment (atmosphere) having a characteristic pressure equal to that of the desired switch point (selected level). Under the pressurized conditions, capsule 54 is then threadably advanced further until piston 66 displaces disc 50 from the illustrated position to the closed position. Valve-switch 10 is thereby calibrated and requires no additional seals or process steps.

Disc 50 losely fits within the seat defined by washer 48. Accordingly, no seal is formed therebetween and fluid from the pneumatic tire can easily pass through the point of interconnection of the two. As a result, fluid pressure on both sides of disc 50 are equalized at all times, i.e. establishing a pressure differential across disc 50 is not a factor in the present invention.

Figure 3:
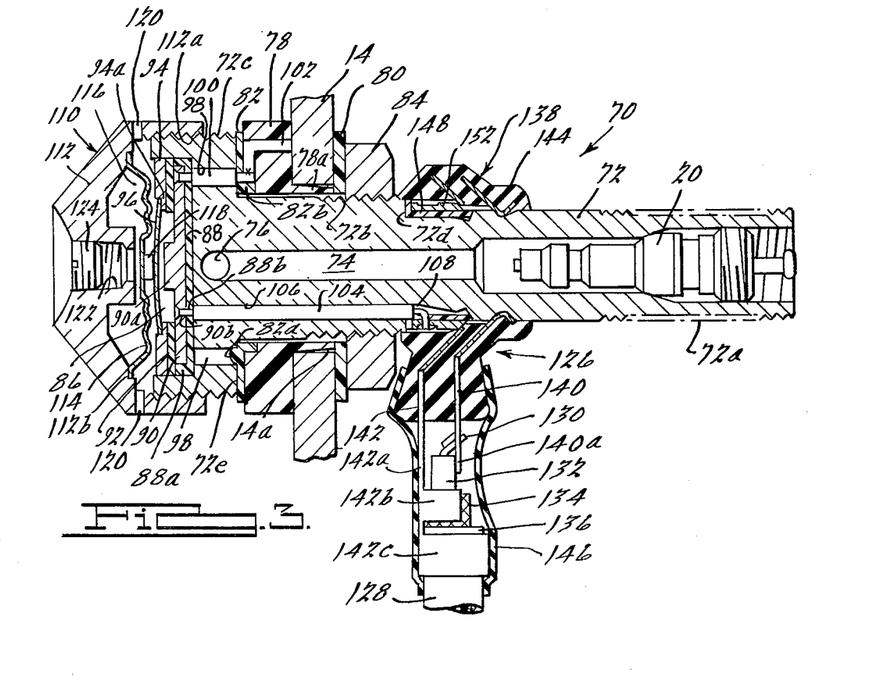
FIG. 3 is a cross-sectional view of an alternative embodiment of the invention.

Referring to FIG. 3, a first alternative embodiment of the present invention is illustrated. The alternative valve-switch 70 comprises a body 72 constructed of brass or other suitable material and having three discrete sequentially increasing (from right to left) areas of increased diameter 72a, 72b and 72c, each defining coaxially aligned external threads. Steps 72d and 72e are defined by the outer surface of body 72 at the points of transition between areas of increasing diameter 72a and 72b, and 72b and 72c respectively. Body 72 has an axial bore 74 therethrough interconnecting the atmosphere with the pneumatic tire cavity through an intermediate radially disposed bore 76. Valve core assembly 20 is disposed within bore 74 in the usual manner. The operation of valve core 20 and bores 74 and 76 are substantially as described in the description of the preferred embodiment of the invention.

Intermediate area of increased diameter 72b of body 72 passes through an aperture 14a in a wheel 14 with area 72a of body 72 projecting outwardly therefrom. Valve-switch 70 is insulatively mounted to wheel 14 through the use of two nonconducting washers 78 and 80 constructed of fiber material, plastic or other suitable material. Washer 78 is disposed within the tire cavity, abutting the left-hand most surface of wheel 14. Washer 78 includes an integral annular collar 78a which projects rightwardly substantially through aperture 14a in wheel 14, thereby spacing area 72b of body 72 from wheel 14. Washer 80 is likewise constructed of fiber material, plastic or other suitable material and is disposed externally of the tire cavity abutting the right-hand most surface of wheel 14. A molded plastic gasket 82 is disposed between left-hand most surface of washer 78 and step 72c of body 72. An internally threaded steel nut 84 mates with the threads on area 72b of body 72 and clampingly secures body 72 to wheel 14 by retaining body 72, gasket 82, washers 78 and 80 in the position illustrated. Accordingly, valve-switch 70 is rigidly secured to wheel 14 but electrically insulated therefrom.

The left-hand most end of area 72c of body 72 defines a switch receiving recess 86 which is open at the left-hand most end of body 72. An insulating rubber spacer 88 nests within the right-hand most extent of switch receiving cavity 86. A disc shaped brass plate 90 abuts rubber spacer 88. A leftwardly extending circumferential rib 88a integral with spacer 88 circumferentially insulates a plate 90 constructed of conductive material from body 72 and prevents radial displacement thereof. A thin (0.003 inch) mica insulating washer 92 overlays the left-hand most surface of plate 90. Finally, a steel washer 94 is pressed (with a slight interference fit) within switch receiving cavity 86 abutting the left-hand most surface of mica insulator 92. Body 72 and washer 94 thus sandwich rubber spacer 88, plate 90 and washer 92 together, retaining them in the illustrated position. Additionally, washer 94 has two inwardly projecting webs 94a which provide a land for a snap action disc 96. In this embodiment, snap action disc 96 comprises a moving contact and an axially centered area of increased thickness 90a of plate 90 comprises a fixed contact. The switch portion of valve-switch 70 is illustrated in its electrically "open" state. When disc 96 is displaced rightwardly to abut area of increased thickness 90a, the switch is in the "closed" condition or state.

Two axially aligned apertures 98 interconnect switch receiving cavity 86 and step 72e. An insulated wire 100 passes through the upper most aperture 98 as illustrated in FIG. 3. Wire 100 electrically interconnects plate 90 with a metal tooth 102 molded within washer 78. The exposed conductor ends of wire 100 are soldered or otherwise suitably affixed to plate 90 and tooth 102. The end of tooth 102 distal wire 100 protrudes slightly rightwardly from washer 78 so as to contact the metal of wheel 14. Tooth 102 is sharpened or otherwise adapted to bite into wheel 14 when nut 84 is tightened so as to insure the integrity of electrical connection between the two. Thus, a conducting path between plate 90 and wheel 14 is defined but which is electrically insulated from body 72. A leftwardly projecting protuberance 82a is molded integrally with plastic gasket 82 and is in alignment and disposed within lower most aperture 98 at the point where it opens in step 72e. This insures rotational alignment will be achieved between gasket 82 and body 72 whereby the conductor of wire 100 will pass through a registering aperture 82b formed in gasket 82. Body 72 of valve-switch 70, being formed of an electrically conducting metal, serves as one of the terminals of the switch portion of valve-switch 70. Thus, a conducting path is formed including wheel 14, tooth 102, wire 100, plate 90, disc 96, washer 94 and body 72.

A separate ground wire 104 passes through an axially aligned passageway 106 and exits body 72 at an opening 108 in the outside surface of body 72 rightwardly of nut 84. The conductor portion of wire 104 passes through registering apertures 88b and 90b in spacer 88 and plate 90 respectively. The conductor portion of wire 104 is soldered or otherwise suitably affixed to plate 90. The other end of wire 104 exits body 72 for eventual connection with an external terminal as will be described hereinbelow in more detail.

A capsule 110 closes the open end of switch receiving cavity 86 and comprises a cup shaped first rigid wall member or body 112 and a second compliant wall member or diaphragm 114. The internal circumferential surface 112a threadably engages the threads formed on area 72c of body 72. Body 112 also defines an annular land 112b within which nests the circumferential surface of diaphragm 114 which is affixed thereto such as by welding. Body 112 and diaphragm 114 thus define a sealed switch cavity 116. A cylindrical piston or plunger 118 is welded, glued or otherwise suitably axially affixed to the right-hand most surface of diaphragm 114. Fluid communication between the portion of switch receiving cavity 86 intermediate the right-hand most surface of diaphragm 114 and the left-hand most surface of disc 96 is achieved through a plurality of circumferentially spaced radially disposed apertures 120 in body 112.

An axially aligned bore 122 in body 112 interconnects switch cavity 116 with the atmosphere temporarily during manufacture. Once switch cavity 116 is pressurized as described in the discussion of the preferred embodiment of the invention hereinbelow, bore 122 is sealed with a threaded plug 124. Again, as in the preferred embodiment of the invention, body member 112, diaphragm 114 and plug 124 of capsule 110 are formed of metal to insure long term seal integrity and pressure retention within switch cavity 116. The manufacturing and assembly steps of the present alternative embodiment of the invention as well as operation of the switch is substantially identical to that described in the discussion of operation and manufacture of preferred embodiment of the invention illustrated in FIG. 1 hereinbelow.

Figure 3A:
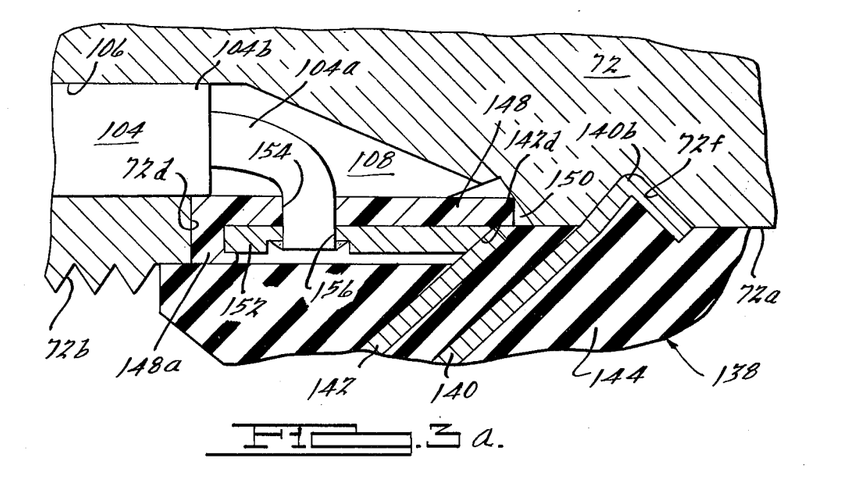
FIG. 3a is a broken cross-sectional view of a portion of FIG. 3 on an enlarged scale.

Referring to FIGS. 3 and 3a, a method of interconnecting the present embodiment of the switch with an external system such as a tire pressure monitor is illustrated. It is to be understood that the present invention is not limited to use with a low tire monitor. FIG. 3a represents a broken partial view of an area designated 126 of the embodiment illustrated in FIG. 3 in a larger scale.

Valve-switch 70 in a typical application, is interfaced with an associated system through an intermediate coaxial conductor 128 comprising an inner conductor 130, an inner insulator 132, a braided shield conductor 134 and an outer insulator 136. The end of coax conductor 128 associated with valve-switch 70 terminates in a connector 138 comprising first and second terminals 140 and 142 respectively which are insulatively supported within a molded rubber insulator 144. Terminals 140 and 142 define frustroconically shaped contact portions including a number of converging (from left to right) contact fingers which emerge radially inwardly from insulator 144 to physically contact and establish electrical interconnection with valve-switch 70. Contact 140 has a lanced terminal 140a which emerges radially outwardly from insulator 144 and is affixed to conductor 130 such as by soldering. Terminal 142 likewise has a terminal portion 142a emerging radially outwardly from insulator 144. Terminal 142a intregally forms first and second C-shaped clamping portions 142b and 142c which embrace braided shield conductor 134 and outer insulator 136 respectively. Portion 142b is electrically interconnected with shield conductor 134 such as by soldering. Portion 142c provides mechanical integrity between coaxial conductor 128 and connector 138. Finally, a length of heat shrinkable rubber tubing 146 encloses terminals 140 and 142. With this arrangement a shielded, weather resistant interconnection between valve-switch 70 and associated systems is achieved.

The right-hand most ends of the finger contacts of terminal 140 are turned radially outwardly to define a contact point 140b which, in application, is disposed within an annular V-shaped groove 72f defined by area 72a of body 72. During assembly, when connector 138 is installed over body 72 of valve-switch 70, the finger contacts of terminal 140 are displaced radially outwardly as they slide along surface 72a. As connector 138 reaches the illustrated position, finger contacts coact with the resilient rubber insulator 144 to snap into groove 72f. This structure thereby provides a mechanical position retaining detent as well as an electrical inner connection between conductor 130 and body 72 of valve-switch 70.

A tubular cylindrical insulator 148 is disposed within a cylindrical recess 150 defined by the portion of area 72a adjacent step 72d. Passageway 106 terminates through opening 108 into recess 150. Insulator 148 is constructed of plastic or other suitable materials. Insulator 148 comprises a radially outwardly projecting rib portion 148a which abuts step 72d. A tubular cylindrical contact 152 is disposed concentrically radially outwardly from insulator 148. Contact 152 is retained in the position illustrated in FIGS. 3 and 3a by insulator 148 and is electrically isolated from body 72 thereby. The radially inward-most portion of the finger contacts of terminal 142 defines a contact surface 142d which, in the installed position, abuts the right-hand most surface of contact 152. Terminal 142 is electrically insulated from terminal 140 and body 72 by insulator 144. Apertures 154 and 156 are formed in insulator 148 and contact 152 respectively, to register with one another as well as passageway 106 to receive the conductor portion 104a of ground wire 104. Conductor portion 104a is electrically connected to contact 152 such as by soldering, welding or other processes. The conductor portion 104a of ground wire 104 is routed through passageway 106 and out through opening 108 in such a way as to avoid electrical contact with body 72.

A circuit is therefore formed comprising the following elements: center conductor 130, first terminal 140, body 72, washer 94, disc 96, plate 90, conductor 104a, contact 152, terminal 142, and braided shield conductor 134. Additionally, the braided shield conductor 134 is grounded to wheel 14 through wire 100 and metal tooth 102 to assure RF stability. This arrangement provides a valve-switch 70 which operates substantially as was described in the detailed description of operation of the preferred embodiment of the invention hereinabove as well as a dependable, weather tight, electrical interconnection between a related system and a valve body 72.

Body 72 of valve-switch 70 is, at least in one contact state, electrically isolated from ground and/or wheel 14. The last stated feature is significant inasmuch as such an arrangement allows employing the body 72 of valve-switch 70 as an antenna for a wheel-mounted RF transmitter as well as one terminal of an electrical pressure sensing switch.

Figure 4:
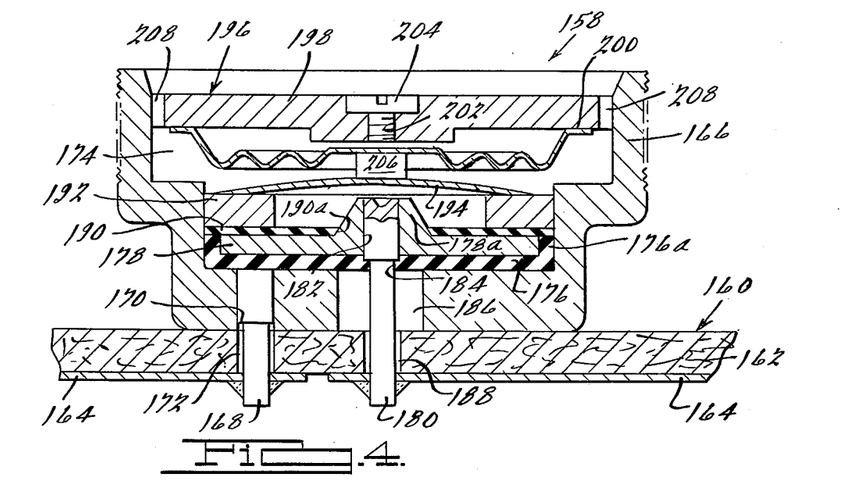
FIG. 4 is a cross-sectional view of another alternative embodiment of the invention.

Referring to FIG. 4, a second alternative embodiment of the present invention is illustrated. In this embodiment, a switch 158 is illustrated in a configuration suitable for mounting within the tire cavity, mounted to a conventional circuit board 160 comprising an insulating base 162 and conductors of metallic foil or the like 164 in the usual manner. Switch 158 comprises a cup-shaped housing 166 formed of electrically conductive metal which rests on base portion 162 of circuit board 160. A connecting pin 168 is press fit within an aperture 170 in housing 166 and projects downwardly therefrom through a registering aperture 172 in circuit board 160. Pin 168 is formed of electrically conductive material and thus, when soldered to the conductor portion 164 of circuit board 160, electrically interconnects housing 166 thereto. Housing 166 defines a switch receiving cavity 174 which is open at the upper extend thereof as illustrated in FIG. 4.

A rubber insulating washer 176 nests within switch receiving cavity 174 and has an upward projecting flange portion 176a integrally formed therein around the circumference thereof. A contact disc 178 nests within rubber insulator 176 and is electrically insulated from housing 166 thereby. The central portion of contact disc 178 defines an upwardly projecting area of increased thickness 178a, the uppermost surface of which defines a fixed contact. A connecting pin 180 extends downwardly through an aperture 182 in portion 178a, as well as an aperture 184 in washer 176. Pin 180 extends downwardly through an enlarged opening 186 in housing 166 and through a registering aperture 188 in circuit board 162. The lowermost portion of pin 180 is electrically connected to a conductor 164 on cirucit board 160 such as by soldering. Pin 180 is interference fit within contact disc 178 and is constructed of electrically conductive material.

Annular flat rubber insulating washer 190 overlays contact disc 178 as well as the uppermost edge of flange portion 176a. Area of increased thickness 178a projects upwardly through an opening 190a in washer 190. An annular steel retaining ring 192 overlays rubber washer 190 as well as contact disc 178 and insulator washer 176, securing them in the illustrated position. The outer circumferential surface of ring 192 forms a slight interference fit with the inner circumferential surface of housing 166. The circumferential edge of a snap disc 194 abuts the upper surface of ring 192. Disc 194 presents a concave surface to contact disc 178 in its relaxed position as illustrated. When the center portion of disc 194 is pressed downwardly, it will be displaced into an abutting relationship with area of increased thickness 178a. Disc 194 therefore constitutes a moving contact.

A sealed capsule 196 comprises a disc shaped first rigid wall member or body 198 and a second compliant wall member or diaphragm 200. Body 198 and diaphragm 200 are formed of steel or other suitable material and are sealingly affixedly engaged around the circumferential edges thereof such as by welding as was described herein above. After being pressurized through an axially aligned aperture 202 in first member 198, capsule 196 is sealed by a screw 204 or the like. A piston or plunger 206 is affixed to the outer surface of diaphragm 200 substantially on the axis thereof and, in the position illustrated in FIG. 4, abutts the uppermost surface of disc 194. The outer circumferential surface of body 198 forms a slight interference fit with the inner circumferential surface of housing 166. After pressurization of capsule 196 and final assembly of switch 158, calibration is effected by forcefully displacing capsule 196 downwardly under an elevated pressure substantially equal to the desired switch pressure point until disc 194 contacts disc 178. A plurality of spaced reliefs 208 are formed in the outer circumferential wall of capsule 196 to establish a path of fluid communication between switch receiving cavity 174 and the tire cavity. Operation of the switch 158 illustrated in FIG. 4 is substantially identical to the operation of valve-switches 10 and 70 as were described in FIG. 1 and 3 respectively herein above.

Although the embodiments described in the detailed description of the invention illustrate temperature compensated fill valve-pressure switches which close a set of electrical contacts when the pressure in a container such as a pneumatic tire falls below a set-point pressure and opens those contacts when the pressure in the tire exceeds the set-point pressure, it is to be understood that reversal of this logic could easily be accomplished by one skilled in the art in light of the present specification. Additionally, although one set of contacts was illustrated in any given embodiment, it is also contemplated that additional contacts could be provided to form multiple functions. Additionally, the illustrative low tire monitor mentioned in the discussion relating to FIG. 1 could easily be extended to include an external temperature transducer which, for example, could be imbedded in the core of the tire associated with the valve-switch and the transducer electrically connected in parallel with the contacts thereby providing a redundant or dual function. An example of such an application would be a tire pressure monitor which operated to detect both a low tire pressure condition as well as an overload or excess tire pressure condition simultaneously. It is to be understood, therefore, that the invention has been described with reference to specific embodiments which provide the features and advantages previously described, and that such specific embodiments are susceptible to modification as will be apparent to those skilled in the art. Accordingly, the following description is not to be construed in a limiting sense.

What is claimed:

1. An improved fluid pressure monitoring switch of the type including a housing adapted for mounting within a container, at least one moving contact and at least one fixed contact both disposed within said housing, said switch operative to monitor the fluid pressure within the container and to shift from a first contact state to a second contact state when the fluid pressure falls below a selected level, the improvement comprising;

a capsule comprising a substantially rigid wall member and a compliant wall member, said wall members defining therebetween a sealed cavity pressurized to a predetermined value, means whereby said compliant wall member is operative to virtually effect a preselectable compensation characteristic by substantially varying the volume of said cavity as a function of cavity and container fluid pressures, said compliant wall member operatively engaging said moving contact for displacement with respect to said fixed contact as a function of fluid temperature within said capsule, and thereby varying said selected level as a function of said fluid temperature; and capsule retention means operative to maintain said rigid wall member in a fixed relationship with said housing.

2. The device of claim 1, wherein said compliant wall member comprises a metal diaphragm.

3. The device of claim 1, wherein in said first contact state, said contacts are electrically open, and in said second contact state, said contacts are electrically closed.

4. The device of claim 3, wherein said housing is constructed of electrically conducting material and is connected to said moving contact.

5. The device of claim 1, further comprising plunger means disposed between said compliant wall member and said moving contact, and is displaceable therewith.

6. The device of claim 1 wherein said capsule retention means is defined by a portion of said housing which nestingly engages said rigid wall member.

7. The device of claim 1, wherein said capsule retention means further comprises manual calibration means operative to vary said selected level.

8. The device of claim 1, wherein said predetermined value equals said selected level.

9. A device for pressurizing a container and monitoring fluid pressure therein, said device comprising:
a body portion defining an inlet passage and adapted to be positioned in an aperture within a wall of said container;
valve means disposed within said passage and operative to selectively pass fluid therethrough;
switch means disposed within said body portion and comprising at least one moving contact and at least one fixed contact, said switch means operating to monitor the fluid pressure within the container and to shift from a first contact state to a second contact state when the fluid pressure falls below a selected level;
a capsule comprising a first, substantially rigid wall member and a second, compliant wall member, said wall members defining a sealed cavity pressurized to a predetermined value, means whereby said second member is operative to virtually effect a preselectable compensation characteristic by substantially varying the volume of said cavity as a function of cavity and container fluid pressures, said second wall member operatively engaging said switch means to displace said moving contact with respect to said fixed contact as a function of fluid temperature within said capsule, and thereby varying said selected level as a function of said fluid temperature; and
capsule retention means operative to maintain said first wall member in a fixed relationship with said body portion.

10. The device of claim 9, wherein said second wall member comprises a metal diaphragm.

11. The device of claim 9, wherein in said first contact state, said switch means is electrically open, and in said second contact state, said switch means is electrically closed.

12. The device of claim 11, wherein said body portion is constructed of electrically conducting material and is connected to said fixed contact.

13. The device of claim 9, further comprising plunger means disposed between said second wall member and said moving contact, and is displaceable therewith.

14. The device of claim 9, wherein said capsule retention means comprises cooperating threads formed in said body portion and first wall member.

15. The device of claim 14, wherein said threads are aligned substantially coaxially with said inlet passage.

16. The device of claim 9, wherein said capsule retention means further comprises manual calibration means operative to vary said selected level.

17. The device of claim 9, wherein said predetermined value equals said selected level.

18. A method of manufacturing a device for pressurizing a container and monitoring fluid pressure therein, said method comprising the forming a body for said device, said body defining an inlet passage and adapted to be positioned in an aperture within a wall of said container;
installing switch means within said body, said switch means comprising at least one moving contact and at least one fixed contact, and operative to monitor the fluid pressure within the container and to shift from a first contact state to a second contact state when the fluid pressure falls below a selected level;
forming a capsule discretely from said body, said capsule comprising a first, substantially rigid wall member and a second, compliant wall member, and defining a sealable cavity;
pressurizing fluid within said cavity to a predetermined value;
sealing said cavity; and
installing the capsule within said body whereby said first wall member if fixed with respect thereto and said second wall member is operative to virtually effect a preselectable compensation characteristic by substantially varying the volume of said cavity as a function of cavity and container fluid pressures, and said second wall member operatively engages said switch means to displace said moving contact with respect to said fixed contact as a function of fluid temperature within said capsule, and thereby varying said selected level as a function of said fluid temperature.

19. The method of claim 18, further comprising the step of calibrating said device by selectively repositioning said capsule with respect to said body under known temperature and pressure conditions.

20. The method of claim 18, wherein the step of forming said capsule comprises the sub-steps of:
forming said first wall member to define a capsule pressurizing aperture;
forming said second wall member; and
sealingly engaging said first and second wall members to define said cavity.

21. The method of claim 20, wherein the step of sealing said cavity comprises plugging said capsule pressurizing aperture after the fluid within said cavity has been pressurized.

22. The method of claim 18, wherein said capsule is installed within said body after said switch means.

23. The method of claim 18, wherein said capsule is installed within said body before said switch means.

24. The method of claim 18, wherein said step of pressurizing fluid within said cavity comprises pressurizing said fluid to a predetermined value which equals said selected level.

25. A fill valve/temperature compensated pressure switch adapted for use with a pneumatic tire and associated mating wheel, said valve-switch comprising:
- a body defining a switch receiving portion and a valve stem portion, said switch receiving portion adapted to be positioned adjacent the inside surface of a wall of said wheel with said valve stem portion for projecting outwardly through an aperture in said wall, said valve stem portion defining valve core receiving means within an inlet passage for interconnecting the interior of said tire with the atmosphere;
- a valve core disposed within said inlet passage and operative to selectively pass air therethrough;
- a switch disposed within said switch receiving portion and comprising at least one moving electrical contact and at least one fixed electrical contact, the switch operating to monitor the air pressure within the tire and to change conductive state when the air pressure falls below a set point level;
- a prepressurized temperature compensating sealed capsule comprising a rigid body portion and a compliant diaphragm disposed within the switch receiving portion and means whereby said diaphragm is operatively engaging the switch to displace the moving contact with respect to the fixed contact as a function of fluid temperature within the capsule and thereby vary the set point level as a function of the air temperature within the tire, said diaphragm operable, under the influence of cavity and tire fluid pressures, for inward and outward excursions with respect to said rigid body portion while in a first contact state, to substantially vary the volume of said cavity as a function of said cavity and tire fluid pressures to virtually effect a preselectable temperature compensation characteristic; and
- means operative to selectively position the rigid body portion of the capsule with respect to the switch to effect establishment of said set point level 26. The valve-switch of claim 25 further comprising a plunger disposed between the diaphragm and moving contact.

27. The valve-switch of claim 25, wherein said rigid body portion and diaphragm are constructed of metal and are formed by welding the adjoining circumferential surfaces thereof.

28. The valve-switch of claim 25, wherein the pressure within said capsule equals the air pressure in said tire at said set point level.

29. A method of manufacturing a device for monitoring fluid pressure within a container, said method comprising the steps of:
- forming a housing for said device, said housing adapted to be positioned within said container;
- installing switch means within said housing, said switch means comprising at least one moving contact and at least one fixed contact, and operative to monitor the fluid pressure within the container and to shift from a first contact state to a second contact state when the fluid pressure falls below a selected level;
- forming a capsule comprising a substantially rigid wall member and compliant wall member defining a sealable cavity therebetween;
- pressurizing fluid within said cavity to a predetermined value;
- sealing said cavity; and
- installing said capsule within said housing whereby said rigid wall member is fixed with respect thereto and said compliant wall member is operative to virtually effect a preselectable temperature compensation characteristic by substantially varying the volume of said cavity as a function of the cavity and container fluid pressure, and said compliant wall member operatively engaging said switch means to displace said moving contact with respect to said fixed contact as a function of fluid temperature within said capsule, and thereby varying said selected level as a function of said fluid temperature.

30. The method of claim 29, further comprising the step of calibrating said device by selectively repositioning said capsule with respect to said housing under known temperature and pressure conditions.

31. The method of claim 29, wherein the step of forming said capsule comprises the sub-steps of:
- forming said rigid wall member to define a capsule pressurizing aperture;
- forming said compliant wall member; and
- sealingly engaging said rigid and compliant wall members to define said cavity.

32. The method of claim 30, wherein the step of sealing said cavity comprises plugging a capsule pressurizing aperture after the fluid within said cavity has been pressurized.

33. The method of claim 29, wherein said capsule is installed within said housing after said switch means.

34. The method of claim 29, wherein said capsule is installed within said housing before said switch means.

35. The method of claim 29, wherein said step of pressurizing fluid within said cavity comprises pressurizing said fluid to a predetermined value which equals said selected level.

36. The method of claim 31, wherein said capsule is sealed upon engagement of said rigid and compliant wall members.

37. An improved fluid pressure monitoring switch of the type including a housing adapted for mounting within a container, at least one moving contact and at least one fixed contact both disposed within said housing, said switch operative to monitor the fluid pressure within the container and to shift from a first contact state to a second contact state when the fluid pressure falls below a selected level the improvement comprising:
- a capsule comprising a structurally rigid element and defining a sealed cavity defined at least in part by a compliant wall member, said cavity pressurized to a predetermined value, means whereby said compliant wall member is operatively engaging said moving contact for displacement with respect to said fixed contact as a function of fluid temperature within said capsule, and thereby varying said selected level as a function of said fluid temperature, whereby said compliant wall member is operable, under the influence of cavity and container fluid pressures for inward and outward excursions with respect to said rigid element while in said first contact state to substantially vary the volume of said cavity as a function of said cavity and container fluid pressures to virtually effect a preselectable temperature compensation characteristic; and
- capsule retention means operative to maintain said rigid element in a fixed relationship with said housing.

* * * * *